United States Patent
Tang

(10) Patent No.: US 10,841,789 B2
(45) Date of Patent: Nov. 17, 2020

(54) METHOD AND DEVICE FOR RELAY TRANSMISSION

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 59 days.

(21) Appl. No.: 16/092,038

(22) PCT Filed: Jun. 3, 2016

(86) PCT No.: PCT/CN2016/084810
§ 371 (c)(1),
(2) Date: Oct. 8, 2018

(87) PCT Pub. No.: WO2017/206186
PCT Pub. Date: Dec. 7, 2017

(65) Prior Publication Data
US 2019/0166486 A1 May 30, 2019

(51) Int. Cl.
*H04W 76/14* (2018.01)
*H04W 8/24* (2009.01)
(Continued)

(52) U.S. Cl.
CPC .............. *H04W 8/24* (2013.01); *H04L 69/324* (2013.01); *H04W 76/14* (2018.02); *H04W 88/04* (2013.01); *H04W 72/12* (2013.01); *H04W 92/18* (2013.01)

(58) Field of Classification Search
CPC ....... H04W 8/24; H04W 76/14; H04W 88/04; H04W 72/12; H04W 92/18; H04W 76/11; H04L 69/324
See application file for complete search history.

(56) References Cited

U.S. PATENT DOCUMENTS

| 2010/0302999 | A1 | 12/2010 | Hui | |
|---|---|---|---|---|
| 2011/0194485 | A1* | 8/2011 | Horneman | ......... H04W 72/042 370/315 |

(Continued)

FOREIGN PATENT DOCUMENTS

| CN | 101820361 A | 9/2010 |
|---|---|---|
| CN | 102098725 A | 6/2011 |

(Continued)

OTHER PUBLICATIONS

Third Generation Partnership Project, "Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1 (Apr. 2018) (Year: 2018).*

(Continued)

*Primary Examiner* — Lan-Huong Truong

(57) ABSTRACT

The present invention reduces the complexity and latency in data processing. Disclosed are a method and device for relay transmission. The method includes: a relay terminal device receives a PDU transmitted by a remote terminal device to a network device, where the adaptation layer PDU carries identity information of the remote terminal device, and the adaptation layer PDU is acquired by the remote terminal device by packaging, via a layer 2 adaptation layer, data carried in the adaptation layer PDU; the relay terminal device acquires in the layer 2 adaptation layer the identity information of the remote terminal device carried in the adaptation layer PDU; and the relay terminal device forwards, on the basis of the identity information of the remote terminal device acquired, the data carried in the adaptation layer PDU to the network device.

20 Claims, 5 Drawing Sheets

(51) Int. Cl.
*H04W 88/04* (2009.01)
*H04L 29/08* (2006.01)
*H04W 72/12* (2009.01)
*H04W 92/18* (2009.01)

(56) References Cited

U.S. PATENT DOCUMENTS

| | | | | |
|---|---|---|---|---|
| 2012/0294228 | A1* | 11/2012 | Song | H04W 88/04 370/315 |
| 2013/0064116 | A1 | 3/2013 | Speight | |
| 2014/0226558 | A1* | 8/2014 | Speight | H04W 74/08 370/315 |
| 2015/0029913 | A1 | 1/2015 | Zhou et al. | |
| 2015/0029926 | A1 | 1/2015 | Ryu et al. | |
| 2016/0323777 | A1* | 11/2016 | Pan | H04W 76/14 |
| 2017/0142761 | A1* | 5/2017 | Zhang | H04W 74/08 |
| 2018/0146452 | A1* | 5/2018 | Zhang | H04W 24/04 |
| 2018/0192461 | A1* | 7/2018 | Naik | H04W 76/15 |
| 2018/0213577 | A1 | 7/2018 | Burbidge et al. | |
| 2018/0255499 | A1 | 9/2018 | Loehr et al. | |
| 2019/0059015 | A1 | 2/2019 | Lee et al. | |
| 2019/0166486 | A1 | 5/2019 | Tang | |

FOREIGN PATENT DOCUMENTS

| | | |
|---|---|---|
| CN | 102318431 A | 1/2012 |
| CN | 102759784 A | 10/2012 |
| CN | 103379651 A | 10/2013 |
| CN | 103814596 A | 5/2014 |
| CN | 105451208 A | 3/2016 |
| EP | 3393055 A1 | 10/2018 |
| JP | 2014527763 A | 10/2014 |
| WO | 2010113267 A1 | 10/2010 |
| WO | 2015115749 A1 | 8/2015 |
| WO | 2015125479 A1 | 8/2015 |
| WO | 2015128537 A1 | 9/2015 |
| WO | 2015142425 A1 | 9/2015 |
| WO | 2016020072 A1 | 2/2016 |

OTHER PUBLICATIONS

International Search Report in the international application No. PCT/CN2016/077913, dated Dec. 30, 2016.
English translation of the Written Opinion of the International Search Authority in the international application No. PCT/CN2016/077913, dated Dec. 30, 2016.
Supplementary European Search Report in the European application No. 16895919.5, dated Jul. 8, 2019.
Alcatel-Lucent Shanghai Bell et al: "Consideration on traffic multiplexing for relay operation", 3GPP Draft; R2-094343, 3rd Generation Partnership Project (3GPP), Mobile Competence Centre ; 650, Route Des Lucioles ; F-06921 Sophia-Antipolis Cedex; France, No. Shenzhen, China; Aug. 17, 2009, Aug. 17, 2009 (Aug. 17, 2009), XP050352580, [retrieved on Aug. 17, 2009] * pp. 2-3 *.
International Search Report in international application No. PCT/CN2016/084810, dated Mar. 2, 2017.

Written Opinion of the International Search Authority in international application No. PCT/CN2016/084610, dated Mar. 2, 2017.
Huawei et al:"L2 UE Relay technology consideration for wearable", 3GPP Draft; R2-162642 L2 Relay Technology Consideration for Wearable, 3rd Generation Partnership Project (3GPP), Mobile Competence Centre; 650, Route Des Lucioles; F-06921 Sophia-Antipolis Cedex; F, vol. RAN WG2, No. Dubrovnik, Croatia; Apr. 11, 2016-Apr. 15, 2016 Apr. 2, 2016(Apr. 2, 2016), XP051082482, Retrieved from the Internet: URL: http://www.3gpp.org/ftp/tsg_ran/WG2_RL2/TSGR2_93bis/Docs/[retrieved on Apr. 2, 2016]*Chapter 2.1 Concept of L2UE Relay* *Chapter 2.2 User plane stack for L2 UE Relay*.
"3rd Generation Partnership Project; Technical Specification Group Radio Access Network; Evolved Universal Terrestrial Radio Access (E-UTRA); LTE-WLAN Aggregation Adaptation Protocol (LWAAP) specification (Release 13)", 3GPP Standard; 3GPP TS 36.360, 3rd Generation Partnership Project (3GPP), Mobile Competence Centre; 650, Route Deslucioles; F-06921 Sophia-Antipolis Cedex; France, vol. RAN WG2, No. VI3.0.0, Apr. 7, 2016 (Apr. 7, 2016), pp. 1-9, XP051088563, [retrieved on Apr. 7, 2016] *Chapter 4.2 LWAAP architecture* *Chapter 4.3 Services* *Chapter 6.1.2 LWAAP data PDU*.
Ericsson:"Relaying scenarios for wearables", 3GPP Draft; R2-163949—Relaying Scenarios for 1 Wearables, 3rd Generation Partnership Project (3GPP), Mobile Competence Centre; 650, Route Des Lucioles ; F-06921 Sophia-Anti Polis Cedex ; France, vol. RAN WG2, No. Nanjing, P. R. China; May 23, 2016-May 27, 2016 May 22, 2016 (May 22, 2016), XP051105307 Retrieved from the Internet: URL:http://www.3gpp.org/ftp/Meetings_3GPP_SYNC/RAN2/Docs/[retrieved on May 22, 2016]*Chapter 2.1 L2 relaying*.
Huawei et al: "Feasibility of Bluetooth for UE relay", 3GPP Draft; R2-163601, 3rd Generation Partnership Project (3GPP), Mobile Competence Centre ; 650, Route Des Lucioles ; F-06921 Sophia-Antipolis Cedex; France, vol. RAN WG2, No. Nanjing; May 23, 2016-May 27, 2016 May 22, 2016 (May 22, 2016), XP051105046, Retrieved from the Internet: URL:http://www.3gpp.org/ftp/Meetings_3GPP_SYNC/RAN2/Docs/[retrieved on May 22, 2016]*Chapter 2.1 Protocol stacks*.
Supplementary European Search Report in European application No. 16903571.4, dated Jan. 17, 2019.
English Translation of the Written Opinion of the International Search Authority in international application No. PCT/CN2016/084810, dated Mar. 2, 2017.
ZTE,Considerations on the UE—Network Relays[online],3GPP TSG-RANWG2#69bis R2-151169, the Internet <URL:http://www.3gpp.org/ftp/tsg_ran/WG2_RL2/TSGR2_89bis/Docs/R2- 151169.zp>,2015, Apr. 24, 2015.
First Office Action of the Japanese application No. 2018-538562, dated Dec. 24, 2019.
Motivation for SI: Further LTE D2D Enhancements for Wearables and MTC [online], 3GPP TSG-RAN#71 RP-160427, < URL:http://www.3gpp.org/ftp/tsg_ran/TSG_RAN/TSGR_71/Docs/RP-160427.zip >, issued on Mar. 10, 2016.
First Office Action of the Japanese application No. 2018-557077, dated Feb. 28, 2020.
First Office Action of the European application No. 16903571.4, dated Jun. 26, 2020.

* cited by examiner ical FIELD

METHOD AND DEVICE FOR RELAY TRANSMISSION

TECHNICAL FIELD

Embodiments of the disclosure relate to the field of communications, and more particularly to a method and device of relay transmission.

BACKGROUND

A Device-to-Device (D2D) technology refers to that adjacent terminal devices may perform data transmission in a close range in a D2D link manner without forwarding through a network device. A licensed band resource may be shared by D2D communication and a cellular system to form a unified hybrid cellular-D2D network. In the hybrid network, part of terminal devices may still work in a cellular communication mode, namely communicating with other terminal devices through a network device, while part of terminal devices may work in a D2D communication mode, namely performing direct data transmission with the other terminal devices through D2D links with the other terminal devices.

In addition, data transmission between a network device and a terminal device may be assisted through a D2D relay. In such case, a D2D communication mode is adopted between the D2D relay and a D2D terminal, while a cellular communication mode is adopted between the D2D relay and the network device. The D2D relay receives and forwards data in a half duplex manner and the modes are switched in a receiving and forwarding process.

In a conventional art, a D2D relay relays data transmission between a D2D terminal and a network device through an Internet Protocol (IP) layer (i.e., layer 3). For a received data packet, data relay may be implemented by decapsulation processing sequentially through layer 1 (i.e., a Physical (PHY) layer), layer 2 (including a Media Access Control (MAC) layer, a Radio Link Control (RLC) layer and a Packet Data Convergence Protocol (PDCP) layer) and layer 3 and encapsulation processing sequentially through layer 3, layer 2 and layer 1, which is relatively high in complexity and relatively long in data processing delay.

SUMMARY

The embodiments of the disclosure provide a method and device of relay transmission, which may reduce relay transmission processing complexity and reduce a data delay.

A first aspect provides a method of relay transmission, which may include the following actions. A relay terminal device receives a Protocol Data Unit (PDU) sent to a network device by a remote terminal device. The ADPtive (ADP)-layer PDU contains identifier information of the remote terminal device and the ADP-layer PDU is obtained through performing, by the remote terminal device, encapsulation processing on data contained in the ADP-layer PDU in an ADP layer of layer 2. The relay terminal device acquires the identifier information, contained in the ADP-layer PDU, of the remote terminal device in an ADP layer of layer 2. The relay terminal device forwards the data contained in the ADP-layer PDU to the network device according to the acquired identifier information of the remote terminal device.

Therefore, according to the method of relay transmission of the embodiments of the disclosure, the remote terminal device sends the ADP-layer PDU to the relay terminal device. The ADP-layer PDU contains the identifier information of the remote terminal device, and the relay terminal device may recognize the identifier information, contained in the ADP-layer PDU, of the remote terminal device in the ADP layer and forward the data contained in the ADP-layer PDU according to the identifier information of the remote terminal device. Compared with a layer-3 relay manner adopted by the relay terminal device in the conventional art, such a manner may reduce processing complexity of the relay terminal device, reduce a transmission delay of relay data and improve overall performance of a system.

According to an embodiment, a communication interface between the relay terminal device and the remote terminal device may be a first interface, and a communication interface between the relay terminal device and the network device may be a second interface.

According to an embodiment, a user-plane protocol stack, configured for relay transmission, of the relay terminal device may include layer 1 and layer 2 and may not include layer 3. In a user-plane protocol stack, corresponding to the second interface, of the relay terminal device, layer 1 may specifically be a PHY layer and layer 2 may only include a MAC layer or may further include an RLC layer and a PDCP layer on the basis of the MAC layer.

According to an embodiment, in the user-plane protocol stack, corresponding to the first interface, of the relay terminal device, layer 2 may only include a bottom layer and the ADP layer located above the bottom layer, and the ADP layer and the ADP layer located above a bottom layer in layer 2 of a user-plane protocol stack of the remote terminal device may mutually be equivalent layers. Or layer 2 may further include an RLC layer and a PDCP layer on the basis of the bottom layer and the ADP layer, and the ADP may be at any position above the bottom layer. For example, the ADP layer may be located between the bottom layer and the RLC layer.

According to an embodiment, in the user-plane protocol stacks, corresponding to the first interface, of the relay terminal device and the remote terminal device, layer 1 and the bottom layers of layer 2 may correspond to a D2D communication technology adopted on the first interface. For example, when the D2D communication technology is a SideLink (SL) technology of Long Term Evolution (LTE), layer 1 may be a PHY layer and the bottom layer of layer 2 may specifically be a MAC layer.

In such a manner, the ADP layers may be arranged in layer 2 of the remote terminal device and the relay terminal device to enable the first interface between the remote terminal device and the relay terminal device to support any D2D communication technology, thereby improving compatibility and extensibility of the system.

According to an embodiment, the user-plane protocol stacks, configured for relay transmission, of the remote terminal device and the network device may include layer 1 and layer 2 and may not include layer 3. Layer 2 of the user-plane protocol stack of the remote terminal device may include the bottom layer, the ADP layer, an RLC layer and a PDCP layer and layer 2 of the user-plane protocol stack of the network device may include a MAC layer, an RLC layer and a PDCP layer. According to an embodiment, layer 1 of the user-plane protocol stack of the remote terminal device and layer 1 of the user-plane protocol stack of the relay terminal device are mutually equivalent layers and the bottom layer and ADP layer in layer 2 of the remote terminal device and the bottom layer and ADP layer in layer 2 of the relay terminal devices are mutually equivalent layers respectively. According to an embodiment, if layer 2 of the relay terminal device does not include the RLC layer and the PDCP layer, the RLC layer of the user-plane protocol stack of the remote terminal device and the RLC layer in the user-plane protocol stack of the network device may mutually be equivalent layers and the PDCP layer of the user-plane protocol stack of the remote terminal device and the PDCP layer in the user-plane protocol stack of the network device may mutually be equivalent layers.

The ADP-layer PDU received by the relay terminal device may contain the identifier information of the terminal device. According to an embodiment, the identifier information of the remote terminal device includes an ADP-layer identifier of the remote terminal device or a terminal device identifier of the remote terminal device. According to an embodiment, the ADP-layer identifier may be allocated by the network device in a process of establishing a bearer for the remote terminal device.

According to an embodiment, the relay terminal device may recognize the identifier information, contained in the ADP-layer PDU, of the remote terminal device in the ADP layer of layer 2 to determine the remote terminal device corresponding to the ADP-layer PDU.

According to an embodiment, the ADP-layer PDU further contains bearer identifier information of a bearer to which the data belongs.

The bearer may be a radio bearer established between the remote terminal device and the network device. According to an embodiment, the bearer may include a first bearer between the remote terminal device and the relay terminal device and a second bearer between the relay terminal device and the network device. The first bearer and the second bearer may correspond to the same or different bearer identifier information.

According to an embodiment, the bearer identifier information of the bearer may include a bearer identifier or a Logical Channel Identifier (LCID). For example, the bearer identifier information of the bearer may specifically be a bearer identifier of the first bearer.

In a possible implementation mode of the first aspect, the action that the relay terminal device forwards the data contained in the ADP-layer PDU to the network device according to the acquired identifier information of the remote terminal device may include the following actions. The relay terminal device generates a layer-2 PDU corresponding to a second interface according to the identifier information of the remote terminal device, the second interface between a communication interface between the relay terminal device and the network device. The relay terminal device sends the layer-2 PDU corresponding to the second interface to the network device.

According to an embodiment, the relay terminal device may send a data packet containing the data to the network device. The data packet may specifically be a layer-2 data frame or a layer-2 PDU. The layer-2 PDU may specifically be a MAC PDU. Or, if the user-plane protocol stack of the relay terminal device includes the RLC layer and the PDCP layer, the layer-2 PDU may specifically be a MAC PDU, an RLC PDU or a PDCP PDU.

According to an embodiment, the layer-2 PDU may contain the terminal device identifier of the remote terminal device. The relay terminal device may store a corresponding relationship between an ADP-layer identifier and a terminal device identifier. According to an embodiment, the layer-2 PDU may further contain the bearer identifier information of the bearer to which the data belongs, for example, bearer identifier information of the second bearer.

In combination with the abovementioned possible implementation mode, in a second possible implementation mode of the first aspect, a header of the ADP-layer PDU may contain indication information, and the indication information may be configured to indicate that the data contained in the ADP-layer PDU is relay data. Before the action that the relay terminal device forwards the data contained in the ADP-layer PDU to the network device according to the acquired identifier information of the remote terminal device, the method may further include the following actions. The relay terminal device determines that the data contained in the ADP-layer PDU is required to be forwarded to the network device according to the indication information contained in the ADP-layer PDU.

According to an embodiment, the packet header of the ADP-layer PDU may contain the indication information to indicate that the data contained in the ADP-layer PDU is relay data. Therefore, the relay terminal device, after receiving the ADP-layer PDU, may determine that the data contained in the ADP-layer PDU is required to be forwarded according to the indication information in the packet header.

According to an embodiment, the indication information in the ADP-layer PDU may give an indication explicitly or implicitly.

According to an embodiment, the relay terminal device may determine whether the received ADP-layer PDU contains a bearer identifier field or not to determine whether the data contained in the ADP-layer PDU is relay data or not. For example, when the received ADP-layer PDU does not contain the bearer identifier field, the relay terminal device may determine that the data contained in the ADP-layer PDU is not relay data and is sent to the relay terminal device by the remote terminal device. For another example, when the received ADP-layer PDU contains the bearer identifier field, the relay terminal device may determine that the data contained in the ADP-layer PDU is relay data and is required to be forwarded to the network device.

According to an embodiment, the relay terminal device may determine the bearer identifier information in the bearer identifier field in the received ADP-layer PDU to determine whether the data contained in the ADP-layer PDU is relay data or not. For example, a relay bearer identifier range of the bearer configured for relay transmission may be predefined or pre-configured. In such case, according to an embodiment, if the relay terminal device determines that the bearer identifier information contained in the received ADP-layer PDU belongs to the relay bearer identifier range, it may be determined that the data contained in the ADP-layer PDU is relay data. According to an embodiment, if the relay terminal device determines that the bearer identifier information contained in the received ADP-layer PDU does not belong to the relay bearer identifier range, it may be determined that the data contained in the ADP-layer PDU is not relay data.

In combination with the abovementioned possible implementation modes, in a third possible implementation mode of the first aspect, the action that the relay terminal device forwards the data contained in the ADP-layer PDU to the network device according to the acquired identifier information of the remote terminal device includes the following actions. The relay terminal device determines a preamble corresponding to the identifier information of the remote terminal device. The relay terminal device sends the preamble to the network device. The relay terminal device receives an uplink grant sent by the network device according to the preamble. The uplink grant contains an uplink transmission resource allocated by the network device. The relay terminal device adopts the uplink transmission resource to send the data contained in the ADP-layer PDU to the network device.

In combination with the abovementioned possible implementation modes, in a fourth possible implementation mode of the first aspect, the action that the relay terminal device forwards the data contained in the ADP-layer PDU to the network device according to the acquired identifier information of the remote terminal device includes the following actions. The relay terminal device sends a Buffer Status Report (BSR) to the network device. The BSR contains the terminal device identifier of the remote terminal device. The relay terminal device receives a Physical Downlink Control Channel (PDCCH) sent by the network device according to the BSR. The PDCCH is configured to schedule uplink data transmission of the remote terminal device. The relay terminal device sends the data contained in the ADP-layer PDU to the network device according to the PDCCH.

The PDCCH may contain the uplink grant. The relay terminal device may determine the uplink transmission resource allocated for the remote terminal device by the network device according to the uplink grant in the PDCCH and adopt the transmission resource to send the data contained in the ADP-layer PDU.

A second aspect provides another method of relay transmission, which may include the following actions. A remote terminal device performs encapsulation processing on data to be sent to a network device in an ADP layer of layer 2 to obtain a PDU. The ADP-layer PDU contains identifier information of the remote terminal device. The remote terminal device sends the ADP-layer PDU to a relay terminal device.

A third aspect provides another method of relay transmission, which may include the following actions. A relay terminal device receives a data packet sent to a remote terminal device by a network device. The relay terminal device performs encapsulation processing on data contained in the data packet in an ADP layer of layer 2 to obtain a PDU. The ADP-layer PDU contains identifier information of the remote terminal device. The relay terminal device sends the ADP-layer PDU to the remote terminal device.

According to an embodiment, the data packet may contain a terminal device identifier of the remote terminal device. Or the data packet may be scheduled through a PDCCH scrambled by an RNTI of the remote terminal device. Or the data packet may be transmitted by adopting a transmission resource corresponding to the remote terminal device.

According to an embodiment, the identifier information, contained in the ADP-layer PDU, of the remote terminal device may include an ADP-layer identifier of the remote terminal device or the terminal device identifier of the remote terminal device.

According to an embodiment, the data packet may further contain bearer identifier information of a bearer to which the data belongs, for example, bearer identifier information of a second bearer. Correspondingly, the ADP-layer PDU may further contain the bearer identifier information of the bearer, for example, bearer identifier information of a first bearer.

According to an embodiment, the data packet may specifically be a layer-2 data frame or a layer-2 PDU.

In a first possible implementation mode of the third aspect, the action that the relay terminal device receives the data packet sent to the remote terminal device by the network device may include the following actions. The relay terminal device receives a layer-2 PDU sent to the remote terminal device by the network device and corresponding to a second interface. The layer-2 PDU corresponding to the second interface contains the data and the second interface is a communication interface between the relay terminal device and the network device.

According to an embodiment, the layer-2 PDU may specifically be a MAC PDU, an RLC PDU or a PDCP PDU.

In combination with the abovementioned possible implementation mode, in a second possible implementation mode of the third aspect, the data packet may contain a relay specific LCID; and before the actions that the relay terminal device performs encapsulation processing on the data contained in the data packet in the ADP layer of layer 2 to obtain the ADP-layer PDU, the method may further include the following actions. The relay terminal device determines that the data contained in the data packet is required to be forwarded according to the relay specific LCID.

The relay specific LCID may be configured to indicate relay transmission.

In combination with the abovementioned possible implementation modes, in a third possible implementation mode of the third aspect, the data packet may be scheduled by the network device through the PDCCH scrambled by a relay specific RNTI. Before the action that the relay terminal device performs encapsulation processing on the data contained in the data packet in the ADP layer of layer 2 to obtain the ADP-layer PDU, the method may further include the following actions. The relay terminal device determines that the data contained in the data packet is required to be forwarded according to the relay specific RNTI adopted for the PDCCH configured to schedule the data packet.

The relay specific RNTI may be configured to indicate relay transmission.

A fourth aspect provides another method of relay transmission, which may include the following actions. A remote terminal device receives an ADP-layer PDU sent by a relay terminal device. The ADP-layer PDU contains identifier information of the remote terminal device. The remote terminal device acquires the identifier information, contained in the ADP-layer PDU, of the remote terminal device in an ADP layer of layer 2. The remote terminal device determines the remote terminal device corresponding to the ADP-layer PDU according to the acquired identifier information of the remote terminal device.

According to an embodiment, the remote terminal device may determine whether the ADP-layer PDU is sent to it or not according to the acquired identifier information, contained in the ADP-layer PDU, of the remote terminal device.

According to an embodiment, when it is determined that the ADP-layer PDU is sent to it, the remote terminal device may perform demodulation processing on data contained in the ADP-layer PDU.

According to an embodiment, when it is determined that the ADP-layer PDU is not sent to it, the remote terminal device may discard the ADP-layer PDU.

A fifth aspect provides a device of relay transmission, which is configured to execute the method in the first aspect or any possible implementation mode of the first aspect. Specifically, the device includes units configured to execute the method in the first aspect or any possible implementation mode of the first aspect.

A sixth aspect provides another device of relay transmission, which is configured to execute the method in the second aspect or any possible implementation mode of the second aspect. Specifically, the device includes units configured to execute the method in the second aspect or any possible implementation mode of the second aspect.

A seventh aspect provides another device of relay transmission, which is configured to execute the method in the third aspect or any possible implementation mode of the third aspect. Specifically, the device includes units configured to execute the method in the third aspect or any possible implementation mode of the third aspect.

An eighth aspect provides another device of relay transmission, which is configured to execute the method in the fourth aspect or any possible implementation mode of the fourth aspect. Specifically, the device includes units configured to execute the method in the fourth aspect or any possible implementation mode of the fourth aspect.

A ninth aspect provides another device of relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the first aspect or any possible implementation mode of the first aspect.

A tenth aspect provides another device of relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the second aspect or any possible implementation mode of the second aspect.

An eleventh aspect provides another device of relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the third aspect or any possible implementation mode of the third aspect.

A twelfth aspect provides another device of relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the fourth aspect or any possible implementation mode of the fourth aspect.

A thirteenth aspect provides a computer-readable medium, which is configured to store a computer program, the computer program including an instruction configured to execute the method in the first aspect or any possible implementation mode of the first aspect.

A fourteenth aspect provides another computer-readable medium, which is configured to store a computer program, the computer program including an instruction configured to execute the method in the second aspect or any possible implementation mode of the second aspect.

A fifteenth aspect provides another computer-readable medium, which is configured to store a computer program, the computer program including an instruction configured to execute the method in the third aspect or any possible implementation mode of the third aspect.

A sixteenth aspect provides another computer-readable medium, which is configured to store a computer program, the computer program including an instruction configured to execute the method in the fourth aspect or any possible implementation mode of the fourth aspect.

A seventeenth aspect provides a relay transmission system, which includes a relay terminal device, a remote terminal device and a network device.

According to an embodiment, the relay terminal device may be the device in the fifth aspect or any possible implementation mode of the fifth aspect and the remote terminal device may be the device in the sixth aspect or any possible implementation mode of the sixth aspect.

According to an embodiment, the relay terminal device may be the device in the seventh aspect or any possible implementation mode of the seventh aspect and the remote terminal device may be the device in the eighth aspect or any possible implementation mode of the eighth aspect.

BRIEF DESCRIPTION OF DRAWINGS

In order to describe the technical solutions of the embodiments of the disclosure more clearly, the drawings required to be used in descriptions about the embodiments of the disclosure or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It should be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 1:
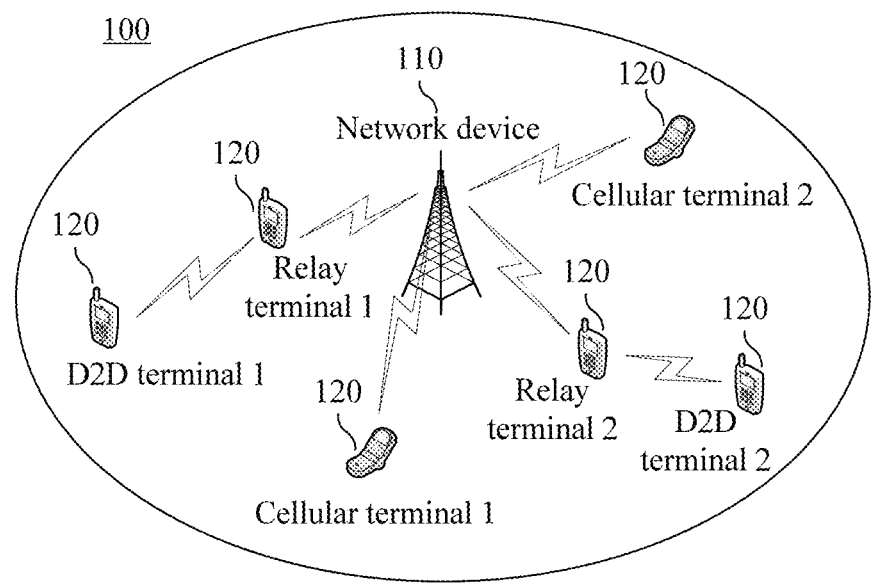
FIG. 1 illustrates a schematic flowchart of a wireless communication system to which the embodiments of the disclosure are applied.

FIG. 1 illustrates a schematic diagram of a wireless communication system 100 to which the embodiments of the disclosure are applied. The wireless communication system 100 may include at least one network device 110. The network device 110 may be a device communicating with a terminal device. Each network device 100 may provide communication coverage for a specific geographical region and may communicate with a terminal device located in the coverage. The network device 110 may be a Base Transceiver Station (BTS) in a Global System of Mobile communication (GSM) or a Code Division Multiple Access (CDMA) system, may also be a NodeB (NB) in a Wideband Code Division Multiple Access (WCDMA) system, and may further be an Evolutional Node B (eNB or eNodeB) in an LTE system or a wireless controller in a Cloud Radio Access Network (CRAN). Or the network device may be a relay station, an access point, a vehicle-mounted device, a wearable device, a network-side device in a future 5th-Generation (5G) network, a network device in a future evolved Public Land Mobile Network (PLMN) or the like.

The wireless communication system 100 further includes multiple terminal devices 120 located within the coverage of the network device 110. The terminal devices 120 may be mobile or fixed. The terminal device 120 may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

A network device and six terminal devices are exemplarily illustrated in FIG. 1. According to an embodiment, the wireless communication system 100 may include multiple network devices and another number of terminal devices may be included in coverage of each network device. There are no limits made thereto in the embodiments of the disclosure. In addition, the wireless communication system 100 may further include another network entity such as a Mobile Management Entity (MME), a Serving Gateway (S-GW) and a Packet data Network Gateway (P-GW). However, the embodiments of the disclosure are not limited thereto.

Specifically, the terminal device 120 may communicate in a cellular communication mode or a D2D communication mode. In the cellular communication mode, the terminal device may communicate with another terminal device through the network device. In the D2D communication mode, the terminal device may directly communicate with another terminal device through a D2D link.

In the multiple terminal devices 120 illustrated in FIG. 1, a cellular terminal device 1 and cellular terminal device 2 which adopt a cellular communication technology to communicate with the network device 110, a D2D terminal device 1 and D2D terminal device 2 which perform data transmission with the network device through relay terminal devices, a relay terminal device 1 and a relay terminal device 2 are exemplarily illustrated. The relay terminal devices may implement relay transmission of uplink data sent to the network device by the D2D terminal devices or relay transmission of downlink data sent to the D2D terminal devices by the network device. Between the relay terminal devices and the D2D terminal devices, there may be first interfaces, for example, PC5 interfaces, and a D2D communication technology is adopted for communication. The D2D communication technology may specifically be an SL technology in LTE, may also be a Wireless Fidelity (WIFI) or Bluetooth technology in a Wireless Local Area Network (WLAN) or is another D2D communication technology. There are no limits made thereto in the embodiments of the disclosure. Between the relay terminal devices and the network device, there may be second interfaces, for example, Uu interfaces, and a cellular communication technology is adopted for communication. For convenient understanding, descriptions will be made with the condition that the first interfaces are specifically PC5 interfaces and the second interfaces are specifically Uu interfaces below. However, the first interfaces and the second interfaces may also specifically be other names. There are no limits made thereto in the embodiments of the disclosure.

In the conventional art, a relay terminal device adopts a layer-3 relay manner for relay, which results in a relatively long data processing delay. In the embodiments of the disclosure, the relay terminal devices may adopt a layer-1 or layer-2 relay manner to relay data transmission between the network device and the D2D terminal devices. In such case, a manner of layer-1 data frame or layer-2 PDU may be adopted for relay data transmitted at the Uu interfaces and a layer-2 PDU may be adopted for relay data transmitted at the PC5 interface. However, the embodiments of the disclosure are not limited thereto.

Figure 2A:
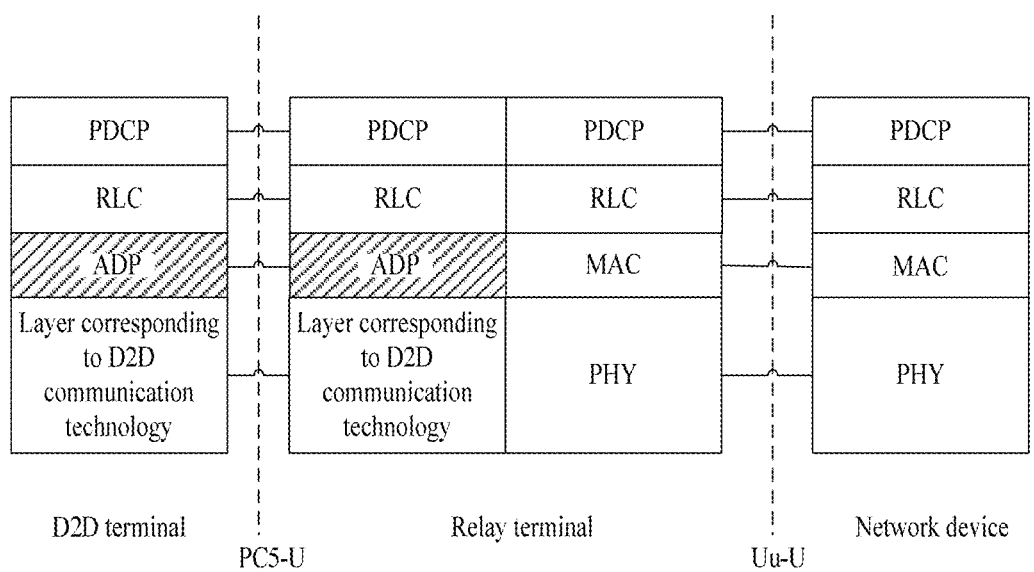
FIG. 2a illustrates a schematic diagram of an example of a user-plane stack protocol, configured for relay transmission, of each device according to an embodiment of the disclosure.
Figure 2B:
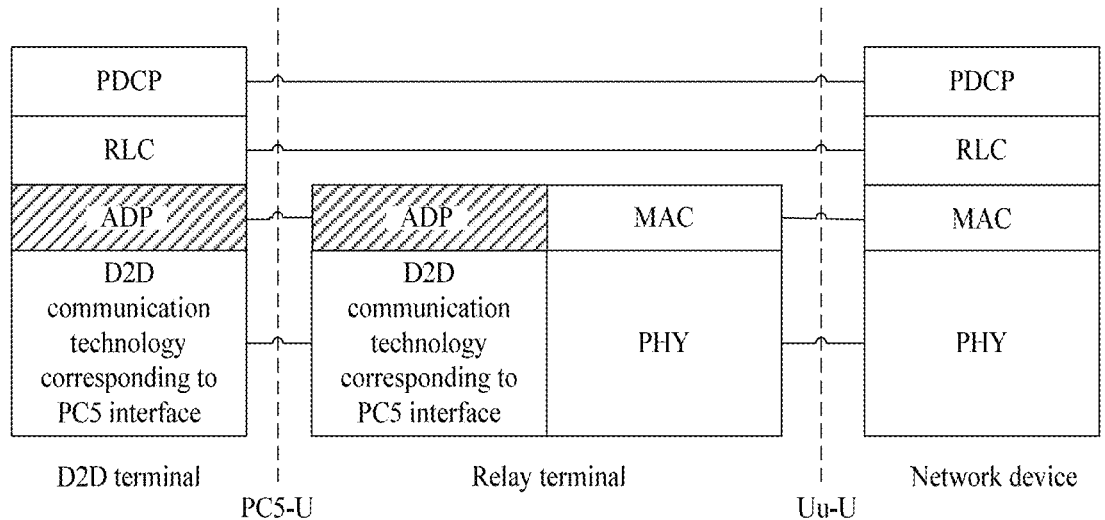
FIG. 2b illustrates a schematic diagram of another example of a user-plane stack protocol, configured for relay transmission, of each device according to an embodiment of the disclosure.

FIG. 2a and FIG. 2b schematically illustrate examples of a user-plane protocol stack, configured for relay transmission, of each device respectively. As illustrated in FIG. 2a, user-plane protocol stacks, configured for relay transmission, of a D2D terminal device, a relay terminal device and a network device may include layer 1 or layer 2. Layer 1 and layer 2, corresponding to a PC5 interface, of the relay terminal device and layer 1 and layer 2, corresponding to the PC5 interface, of the D2D terminal device are mutually equivalent layers respectively. Layer 1 and layer 2, corresponding to a Uu interface, of the relay terminal device and layer 1 and layer 2, corresponding to the Uu interface, of the network device are mutually equivalent layers respectively. In such case, the user-plane protocol stacks, configured for relay transmission, of the relay terminal device, the network device and the D2D terminal device may not include layer 3. However, the embodiments of the disclosure are not limited thereto.

Specifically, in Uu interface User-plane (Uu-U) protocol stacks of the relay terminal device and the network device, layer 1 may specifically be a PHY layer and layer 2 may include a MAC layer, an RLC layer and a PDCP layer. In PC5 interface User-plane (PC5-U) stack protocols of the relay terminal device and the D2D terminal device, a relatively low layer (for example, layer 1, or layer 1 and a bottom layer of layer 2) may correspond to a specific D2D communication technology adopted on the PC5 interface. For example, if the D2D communication technology is specifically an SL technology of LTE, the relatively low layer in the PC5-U stack protocol may include a PHY layer and a MAC layer. If the D2D communication technology is specifically a WIFI technology, the relatively low layer in the PC5-U protocol stack may include the PHY layer and a MAC sublayer, etc. The embodiments of the disclosure are not limited thereto.

As illustrated in FIG. 2a, in the PC5-U stack protocol of the embodiments of the disclosure, for recognizing the D2D terminal device, an ADP layer may be added. The ADP layer may be configured to recognize and encapsulate relay data. Specifically, the ADP layer may be configured to recognize identifier information of the D2D terminal device, for example, an ADP-layer identifier of the D2D terminal device, or may also be configured to recognize a relay specific LCID configured to indicate relay transmission. In addition, the ADP layer may be configured to convert data which is received from a lower layer and transmitted by adopting various D2D communication technologies into a form irrelevant to the D2D communication technology and further transmit the processed data to an upper layer for processing. Similarly, the ADP layer may further be configured to encapsulate data transmitted by the upper layer into a form corresponding to the D2D communication technology adopted for the PC5 interface and may transmit the encapsulated data to the lower layer, for example, transmitted to the bottom layer of layer 2 and layer 1. Therefore, the PC5 interface may support various D2D communication technologies.

According to an embodiment, the ADP layer may be located above the bottom layer of layer 2. The bottom layer of layer 2 may correspond to the D2D communication technology adopted for the PC5 interface. Specifically, in FIG. 2a, the ADP layer is located between the bottom layer of layer 2 and the RLC layer. According to an embodiment, the ADP layer may also be located between the RLC layer and the PDCP layer or at another position of layer 2. There are no limits made thereto in the embodiments of the disclosure.

FIG. 2b schematically illustrates another example of the user-plane protocol stack, configured for relay transmission, of each device. A difference between FIG. 2b and FIG. 2a is that: in FIG. 2b, the user-plane protocol stack of the relay terminal device does not include the RLC layer and the PDCP layer; and correspondingly, the RLC layer of the D2D terminal device and the RLC layer of the network device are mutually equivalent layers and the PDCP layer of the D2D terminal device and the PDCP layer of the network device are mutually equivalent layers. In such case, the relay terminal device, when relaying data between the D2D terminal device and the network device, may not perform analytical processing on the data. However, the embodiments of the disclosure are not limited thereto.

It is to be noted that the examples of FIG. 2a to FIG. 2b are adopted not to limit the scope of the embodiments of the disclosure but only to help those skilled in the art to better understand the embodiments of the disclosure. It is apparent that those skilled in the art may make various equivalent modifications or variations according to the examples of FIG. 2a and FIG. 2b, and such modifications or variations shall also fall within the scope of the embodiments of the disclosure.

Figure 3:
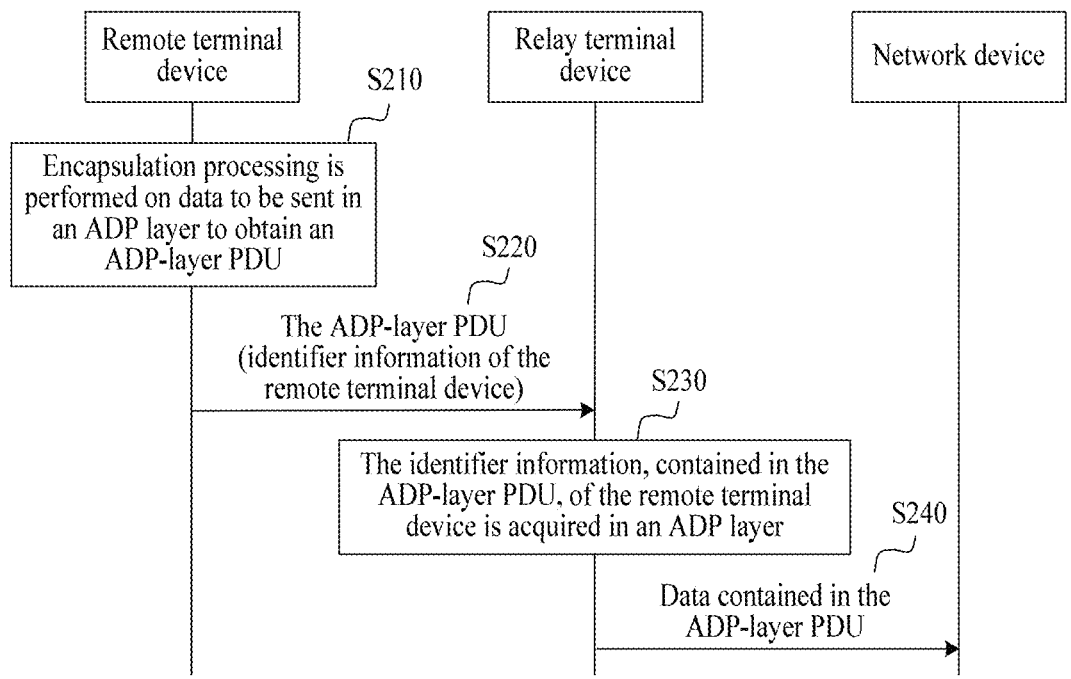
FIG. 3 illustrates a schematic flowchart of a method of relay transmission according to an embodiment of the disclosure.

FIG. 3 schematically illustrates a method 200 of relay transmission according to an embodiment of the disclosure. The method 200 may be applied to the wireless communication system 100. However, the embodiment of the disclosure is not limited thereto. Specifically, the method 200 may be applied to relay transmission of uplink data. That is, a D2D terminal device (which may also be called a remote terminal device) transmits the uplink data to a network device through a relay terminal device.

In S210, a remote terminal device performs encapsulation processing on data to be sent in an ADP layer of layer 2 to generate an ADP-layer PDU.

According to an embodiment, if the ADP layer is located above a bottom layer of layer 2, the remote terminal device may perform encapsulation processing on the data to be sent through the ADP layer, or may also perform encapsulation processing through an RLC layer or sequentially through a PDCP layer and the RLC layer before performing encapsulation processing through the ADP layer. There are no limits made thereto in the embodiment of the disclosure. When encapsulation processing is performed on the data to be sent through the ADP layer, the remote terminal device may add identifier information of the remote terminal device to the data to be sent to obtain the ADP-layer PDU and may transmit the ADP-layer PDU to the bottom layer of layer 2 for further encapsulation processing. However, the embodiment of the disclosure is not limited thereto.

According to an embodiment, the identifier information of the remote terminal device may include a terminal device identifier of the remote terminal device. The terminal device identifier may be configured to uniquely identify the remote terminal device. The terminal device identifier may be predefined. For example, the terminal device identifier may specifically be a device identifier of the remote terminal device or a user identifier of the remote terminal device, etc. Or, the identifier information of the remote terminal device may include an ADP-layer identifier of the remote terminal device, i.e., an identifier for encapsulation and analysis in the ADP layer. The ADP-layer identifier of the remote terminal device may be configured to uniquely identify the remote terminal device during relay transmission. The ADP-layer identifier of the remote terminal device may be predefined and may also be configured by a network device. For example, the ADP-layer identifier of the remote terminal device is allocated for the remote terminal device by the network device in a process of establishing a bearer for the remote terminal device. However, the embodiment of the disclosure is not limited thereto.

According to an embodiment, the remote terminal device may further contain indication information configured to indicate that the data contained in the ADP-layer PDU is relay data in the ADP-layer PDU. That is, the indication information may be configured to indicate that the data contained in the ADP-layer PDU is not sent to the relay terminal device and is required to be forwarded to the network device by the relay terminal device.

According to an embodiment, the indication information in the ADP-layer PDU may give an indication explicitly or implicitly. The indication information may occupy one or more bits.

According to an embodiment, in the embodiment of the disclosure, a bearer identifier field may be contained or not contained in the ADP-layer PDU to indicate whether the data contained in the ADP-layer PDU is relay data or not. Correspondingly, when the relay terminal device receives the ADP-layer PDU sent by the remote terminal device, whether the ADP-layer PDU contains the bearer identifier field or not may be determined. As an optional example, if the ADP-layer PDU does not contain the bearer identifier field, the relay terminal device may determine that the data contained in the ADP-layer PDU is not relay data and is sent to the relay terminal device by the remote terminal device. According to an embodiment, if the ADP-layer PDU contains the bearer identifier field, the relay terminal device may determine that the data contained in the ADP-layer PDU is relay data and is required to be forwarded to the network device. However, the embodiment of the disclosure is not limited thereto.

According to an embodiment, in the embodiment of the disclosure, the relay terminal device may also recognize bearer identifier information in the bearer identifier field in the ADP-layer PDU to determine whether the data contained in the ADP-layer PDU is relay data or not. For example, a relay bearer identifier range of a bearer configured for relay transmission may be predefined or pre-configured. In such case, according to an embodiment, if the relay terminal device determines that the bearer identifier information contained in the received ADP-layer PDU belongs to the relay bearer identifier range, it may be determined that the data contained in the ADP-layer PDU is relay data. According to an embodiment, if the relay terminal device determines that the bearer identifier information contained in the received ADP-layer PDU does not belong to the relay bearer identifier range, it may be determined that the data contained in the ADP-layer PDU is not relay data. However, the embodiment of the disclosure is not limited thereto.

According to an embodiment, the ADP-layer PDU may further contain the bearer identifier information of the bearer to which the data to be sent belongs. The bearer identifier information may include a bearer identifier or an LCID. There are no limits made thereto in the embodiment of the disclosure.

In S220, the remote terminal device sends the ADP-layer PDU to a relay terminal device.

According to an embodiment, the remote terminal device may further process the ADP-layer PDU in layer 1 and send the processed ADP-layer PDU to the relay terminal device through a PC5 interface with the relay terminal device. However, the embodiment of the disclosure is not limited thereto.

According to an embodiment, if a network side configures a transmission resource, for example, a time-frequency resource, a code-domain resource and/or a space-domain resource, configured for relay transmission for the remote terminal device, the remote terminal device may send the ADP-layer PDU to the relay terminal device through the transmission resource configured for relay transmission. In such case, the relay terminal device may determine that the data contained in the ADP-layer PDU is relay data according to the transmission resource occupied by the ADP-layer PDU. According to an embodiment, the remote terminal device may further indicate that the data contained in the ADP-layer PDU is relay data in another manner. There are no limits made thereto in the embodiment of the disclosure.

In S230, the relay terminal device receives the ADP-layer PDU sent by the remote terminal device, acquires identifier information, contained in the ADP-layer PDU, of the remote terminal device in an ADP layer and, in S240, forwards the data contained in the ADP-layer PDU to a network device according to the acquired identifier information of the remote terminal device.

The relay terminal device may analyze the identifier information, contained in the received ADP-layer PDU, of the remote terminal device in the ADP layer. According to an embodiment, if a user-plane protocol stack, corresponding to the PC5 interface, of the relay terminal device further includes an RLC layer and a PDCP layer, the relay terminal device may further transmit the ADP-layer PDU to the RLC layer and the PDCP layer for further analytical processing.

Specifically, the relay terminal device may recognize the identifier information, contained in the received ADP-layer PDU, of the remote terminal device, for example, the ADP-layer identifier of the remote terminal device, in the ADP layer to determine the remote terminal device corresponding to the ADP-layer PDU. The relay terminal device may also perform encapsulation processing on the data contained in the ADP-layer PDU according to the acquired identifier information of the remote terminal device to obtain a data packet corresponding to a Uu interface. The data packet may specifically be a layer-1 data frame or a layer-2 PDU and the data packet is sent to the network device through the Uu interface.

In the embodiment of the disclosure, the layer-1 data frame may refer to that encapsulation processing is performed on the data only through layer 1 and encapsulation processing of a higher layer is not performed. The layer-2 PDU may refer to that an outermost layer or highest layer of the data is encapsulated in layer 2 of the device. According to an embodiment, in a user-plane stack protocol corresponding to the Uu interface, layer 2 may include a MAC layer, an RLC layer and a PDCP layer. Correspondingly, the layer-2 PDU may specifically refer to a MAC PDU, an RLC PDU or a PDCP PDU. The MAC PDU may be obtained by performing encapsulation processing on the data only through the MAC layer in layer 2 without encapsulation processing of the RLC layer and the PDCP layer. The RLC PDU may be obtained by performing encapsulation processing on the data sequentially through the RLC layer and the PDCP layer in layer 2 without encapsulation processing of the PDCP layer. The PDCP PDU may be obtained by performing encapsulation processing on the data sequentially through the PDCP layer, the RLC layer and the MAC layer in layer 2. There are no limits made thereto in the embodiment of the disclosure.

According to an embodiment, the data packet may contain the terminal device identifier of the remote terminal device. For example, the relay terminal device may determine the terminal device identifier corresponding to the ADP-layer identifier contained in the ADP-layer PDU according to a pre-stored corresponding relationship between a terminal device identifier and an ADP-layer identifier and contain the determined terminal device identifier in the data packet. However, the embodiment of the disclosure is not limited thereto.

According to an embodiment, the data packet may also contain the bearer identifier information of the bearer to which the data to be sent belongs. However, the embodiment of the disclosure is not limited thereto.

According to an embodiment, before the relay terminal device sends the data packet to the network device, the relay terminal device may further initiate an uplink grant request and adopt an uplink transmission resource allocated by the network device to send the data packet to the network device.

As an optional embodiment, the relay terminal device may send a scheduling request to the network device. The scheduling request is configured to request the network device to allocate the uplink transmission resource for the relay terminal device. The network device, after receiving the scheduling request, may send an uplink grant to the relay terminal device. The uplink grant is configured to indicate the uplink transmission resource allocated for the relay terminal device by the network device. The relay terminal device, after receiving the uplink grant, may adopt the uplink transmission resource to send the data packet to the network device.

As another optional embodiment, the relay terminal device may determine a preamble allocated for the remote terminal device by the network device at first. For example, the relay terminal device may determine the preamble corresponding to the identifier information, contained in the ADP-layer PDU, of the remote terminal device according to a corresponding relationship between an ADP-layer identifier or a terminal device identifier and a preamble. Then, the relay terminal device may send the preamble to the network device to initiate an uplink grant request flow. The network device, after receiving the preamble sent by the relay terminal device, may send the uplink grant to the relay terminal device and, after receiving the data packet transmitted by adopting the uplink transmission resource indicated by the uplink grant from the relay terminal device, determines the remote terminal device corresponding to the data packet. In such case, according to an embodiment, the data packet may not contain the terminal device identifier of the remote terminal device. Therefore, signaling overhead may further be saved.

As another optional embodiment, the relay terminal device may send a BSR to the network device to initiate the uplink grant request. The BSR may contain the terminal device identifier of the remote terminal device. The network device, after receiving the BSR, may send a PDCCH to the relay terminal device to schedule uplink data transmission of the remote terminal device. The relay terminal device, after receiving the PDCCH, may send the data packet to the network device according to the PDCCH. The network device, after receiving the data packet sent by the relay terminal device, may determine the remote terminal device corresponding to the data packet according to the PDCCH configured to schedule the data packet. In such case, according to an embodiment, the data packet may not contain the terminal device identifier of the remote terminal device. However, the embodiment of the disclosure is not limited thereto.

Therefore, according to the method of relay transmission of the embodiment of the disclosure, the remote terminal device sends the ADP-layer PDU to the relay terminal device, the ADP-layer PDU containing the identifier information of the remote terminal device, and the relay terminal device may recognize the identifier information, contained in the ADP-layer PDU, of the remote terminal device in the ADP layer and forward the data contained in the ADP-layer PDU according to the identifier information of the remote terminal device. Compared with a layer-3 relay manner adopted by the relay terminal device in the conventional art, such a manner may reduce processing complexity of the relay terminal device, reduce a transmission delay of relay data and improve overall performance of a system.

Figure 4:
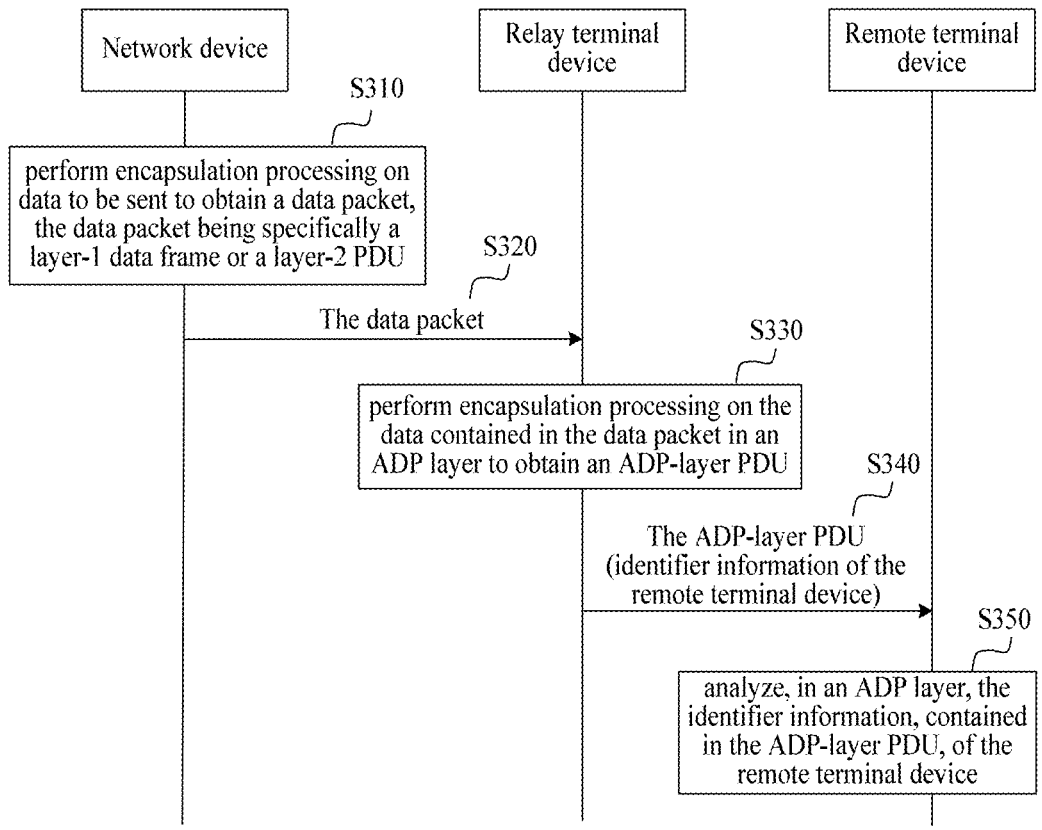
FIG. 4 illustrates a schematic flowchart of a method of relay transmission according to another embodiment of the disclosure.

FIG. 4 schematically illustrates a method 300 of relay transmission according to another embodiment of the disclosure. The method 300 may be applied to relay transmission of downlink data. That is, a network device transmits the downlink data to a remote terminal device through a relay terminal device.

In S310, a network device performs encapsulation processing on data to be sent to generate a data packet. The data packet may specifically be a layer-1 data frame or layer-2 PDU corresponding to a Uu interface.

According to an embodiment, the layer-2 PDU may specifically be a MAC PDU, an RLC PDU or a PDCP PDU. There are no limits made thereto in the embodiment of the disclosure.

According to an embodiment, the data packet may contain a terminal device identifier of a remote terminal device.

According to an embodiment, the data packet may contain a relay specific LCID. The relay specific LCID may be configured to indicate that the data contained in the data packet is relay data and is required to be forwarded by a relay terminal device. According to an embodiment, the relay specific LCID may be preset and may also be pre-allocated by the network device. For example, the network device allocates the relay specific LCID in a process of establishing a bearer for the remote terminal device. However, the embodiment of the disclosure is not limited thereto.

According to an embodiment, the network device schedules the data packet through a PDCCH scrambled by a relay specific RNTI. The relay specific RNTI may be predefined or allocated for the remote terminal device by the network device and, for example, is allocated for the remote terminal device by the network device in the process of establishing the bearer for the remote terminal device. However, there are no limits made thereto in the embodiment of the disclosure.

In S320, the network device sends the data packet to a relay terminal device through the Uu interface.

In S330, the relay terminal device receives the data packet sent by the network device and performs encapsulation processing on the data contained in the data packet in an ADP layer obtain an ADP-layer PDU, the ADP-layer PDU containing identifier information of the remote terminal device.

The relay terminal device may perform analytical processing on the data packet to determine the remote terminal device corresponding to the data packet. According to an embodiment, if the data packet contains the terminal device identifier of the remote terminal device, the relay terminal device may determine the remote terminal device corresponding to the data packet according to the terminal device identifier, contained in the data packet, of the remote terminal device. However, the embodiment of the disclosure is not limited thereto.

The relay terminal device may perform encapsulation processing on the data contained in the data packet through the ADP layer to obtain the ADP-layer PDU. According to an embodiment, the relay terminal device may obtain the ADP-layer PDU by encapsulation processing of the ADP layer and a bottom layer in layer 2 and also by encapsulation processing of a PDCP layer and an RLC layer before encapsulation processing of the ADP layer. After encapsulation processing of the ADP layer, the relay terminal device may transmit the data to the bottom layer for further encapsulation processing. However, the embodiment of the disclosure is not limited thereto.

According to an embodiment, the identifier information of the remote terminal device may include the terminal device identifier of the remote terminal device. Or the identifier information of the remote terminal device may include an ADP-layer identifier of the remote terminal device. However, the embodiment of the disclosure is not limited thereto.

According to an embodiment, the ADP-layer PDU may further contain bearer identifier information of the remote terminal device. There are no limits made thereto in the embodiment of the disclosure.

According to an embodiment, the ADP-layer PDU may further contain identifier information of the relay terminal device. There are no limits made thereto in the embodiment of the disclosure.

According to an embodiment, before the ADP-layer PDU is generated, the relay terminal device may further determine that the data contained in the data packet is relay data and is required to be forwarded. Specifically, if the data packet contains the relay specific LCID, the relay terminal device may determine that the data contained in the data packet is required to be forwarded according to the relay specific LCID. Or, if the data packet is scheduled through the PDCCH scrambled by the relay specific RNTI, the relay terminal device may determine that the data contained in the data packet is required to be forwarded according to the PDCCH configured to schedule the data packet. According to an embodiment, the relay terminal device may further determine that the data contained in the data packet is relay data in another manner. There are no limits made thereto in the embodiment of the disclosure.

In S340, the relay terminal device sends the ADP-layer PDU to the remote terminal device.

According to an embodiment, the relay terminal device may send the ADP-layer PDU through a transmission resource configured for relay transmission. However, the embodiment of the disclosure is not limited thereto.

In S350, the remote terminal device receives the ADP-layer PDU sent by the relay terminal device and acquires the identifier information, contained in the ADP-layer PDU, of the remote terminal device in an ADP layer to determine whether the ADP-layer PDU is sent to it or not.

According to an embodiment, if the identifier information contained in the ADP-layer PDU is matched with the identifier of the remote terminal device, the remote terminal device may determine that the ADP-layer PDU is sent to it and may further perform demodulation processing on the data contained in the ADP-layer PDU. According to an embodiment, if the identifier information contained in the ADP-layer PDU is mismatched with the identifier of the remote terminal device, the remote terminal device may determine that the ADP-layer PDU is not sent to it and may discard the ADP-layer PDU. However, the embodiment of the disclosure is not limited thereto.

Therefore, according to the method of relay transmission of the embodiment of the disclosure, the relay terminal device, after receiving the data packet sent by the network device, may perform encapsulation processing on the data contained in the data packet to obtain the ADP-layer PDU, the ADP-layer PDU containing the identifier information of the remote terminal device, and send the ADP-layer PDU to the remote terminal device, and the remote terminal device may analyze the identifier information, contained in the received ADP-layer PDU, of the remote terminal device in the ADP layer and accordingly determine whether the ADP-layer PDU is sent to it or not. Compared with a layer-3 relay manner adopted by the relay terminal device in the conventional art, such a manner may reduce processing complexity of the relay terminal device, reduce a transmission delay of relay data and improve overall performance of a system.

It should be understood that magnitudes of sequence numbers of each process are not intended to represent an execution sequence and the execution sequence of each process should be determined by their functions and internal logic and shall not form any limit to an implementation process of the embodiments of the disclosure.

The method of relay transmission according to the embodiments of the disclosure is described above in combination with FIG. 1 to FIG. 4 in detail. A device of relay transmission according to the embodiments of the disclosure will be described below in combination with FIG. 5 to FIG. 10 in detail.

Figure 5:
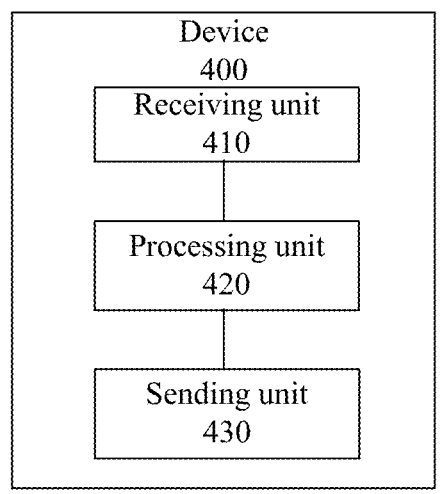
FIG. 5 illustrates a schematic block diagram of a device of relay transmission according to an embodiment of the disclosure.

FIG. 5 illustrates a device 400 of relay transmission according to an embodiment of the disclosure. The device 400 includes a receiving unit 410, processing unit 420 and sending unit 430 which are sequentially coupled.

In an optional embodiment, the device 400 may be applied to relay transmission of uplink data.

The receiving unit 410 may be configured to receive an ADP-layer PDU sent to a network device by a remote terminal device, the ADP-layer PDU containing identifier information of the remote terminal device and the ADP-layer PDU being obtained by performing, by the remote terminal device, encapsulation processing on data contained in the ADP-layer PDU in an ADP layer of layer 2.

The processing unit 420 may be configured to acquire the identifier information, contained in the ADP-layer PDU received by the receiving unit 410, of the remote terminal device in an ADP layer of layer 2.

The sending unit 430 may be configured to forward the data contained in the ADP-layer PDU to the network device according to the identifier information, acquired by the processing unit 420, of the remote terminal device.

According to an embodiment, the identifier information of the remote terminal device may include an ADP-layer identifier of the remote terminal device or a terminal device identifier of the remote terminal device.

According to an embodiment, the processing unit 420 is further configured to generate a layer-2 PDU corresponding to a second interface according to the identifier information of the remote terminal device, the second interface being a communication interface between the device 400 and the network device.

Correspondingly, the sending unit 430 is specifically configured to send the layer-2 PDU, generated by the processing unit 420, corresponding to the second interface to the network device.

According to an embodiment, a header of the ADP-layer PDU may contain indication information. The indication information is configured to indicate that the data contained in the ADP-layer PDU is relay data. In such case, the processing unit 420 may further be configured to, before the sending unit 430 forwards the data contained in the ADP-layer PDU to the network device according to the acquired identifier information of the remote terminal device, determine that the data contained in the ADP-layer PDU is required to be forwarded to the network device according to the indication information contained in the ADP-layer PDU.

In another optional embodiment, the device 400 may be applied to relay transmission of downlink data.

The receiving unit 410 may be configured to receive a data packet sent to the remote terminal device by the network device.

According to an embodiment, the data packet may specifically be a layer-2 data frame or a layer-2 PDU.

The processing unit 420 may be configured to perform encapsulation processing on data contained in the data packet received by the receiving unit 410 in the ADP layer of layer 2 to obtain the ADP-layer PDU, the ADP-layer PDU containing the identifier information of the remote terminal device.

The sending unit 430 may be configured to send the ADP-layer PDU obtained by the processing unit 420 to the remote terminal device.

According to an embodiment, the receiving unit 410 may specifically be configured to receive the layer-2 PDU sent to the remote terminal device by the network device and corresponding to the second interface, the layer-2 PDU corresponding to the second interface containing the data and the second interface being the communication interface between the device and the network device.

According to an embodiment, the data packet contains a relay specific LCID. In such case, the processing unit 420 may further be configured to, before encapsulation processing is performed on the data contained in the data packet in the ADP layer of layer 2 to obtain the ADP-layer PDU, determine that the data contained in the data packet is required to be forwarded according to the relay specific LCID.

According to an embodiment, the data packet is scheduled by the network device through a PDCCH scrambled by a relay specific RNTI. In such case, the processing unit 420 may further be configured to, before encapsulation processing is performed on the data contained in the data packet in the ADP layer of layer 2 to obtain the ADP-layer PDU, determine that the data contained in the data packet is required to be forwarded according to the relay specific RNTI adopted for the PDCCH configured to schedule the data packet.

In the embodiment of the disclosure, a communication interface between the device 400 and the remote terminal device may be a first interface.

According to an embodiment, in a user-plane protocol stack, corresponding to the first interface, of the device 400, layer 2 may only include a bottom layer and the ADP layer located above the bottom layer. Or, in the user-plane protocol stack, corresponding to the first interface, of the device 400, layer 2 may include the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the device and the remote terminal device.

Specifically, the layer located below the ADP layer may include layer 1 and the bottom layer of layer 2.

In an optional example, the device 400 may specifically be the relay terminal device in the abovementioned embodiments and the device 400 may be configured to execute each flow and/or step corresponding to the relay terminal device in the abovementioned method embodiments, which will not be elaborated herein for avoiding repetitions.

Figure 6:
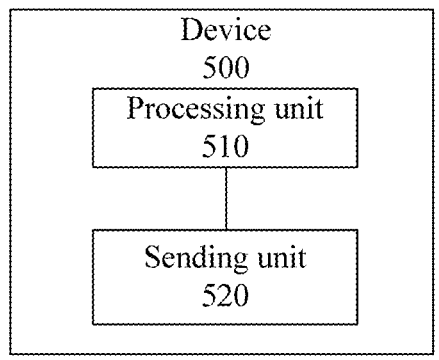
FIG. 6 illustrates a schematic block diagram of another device of relay transmission according to an embodiment of the disclosure.

FIG. 6 illustrates a device 500 of relay transmission according to an embodiment of the disclosure. The device 500 may be applied to relay transmission of uplink data. The device 500 includes a processing unit 510 and a sending unit 520.

The processing unit 510 is configured to perform encapsulation processing on data to be sent to a network device in an ADP layer of layer 2 to obtain an ADP-layer PDU, the ADP-layer PDU containing identifier information of the device 500.

The sending unit 520 is configured to send the ADP-layer PDU generated by the processing unit 510 to a relay terminal device.

According to an embodiment, the identifier information of the device 500 includes an ADP-layer identifier of the device 500 or a terminal device identifier of the device 500.

A communication interface between the relay terminal device and the device 500 may specifically be a first interface.

According to an embodiment, in a user-plane protocol stack, corresponding to the first interface, of the relay terminal device, layer 2 may only include a bottom layer and an ADP layer located above the bottom layer. Or, in the user-plane protocol stack, corresponding to the first interface, of the relay terminal device, layer 2 includes the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the relay terminal device and the device 500.

According to an embodiment, a header of the ADP-layer PDU contains indication information. The indication information is configured to indicate that the data contained in the ADP-layer PDU is relay data.

According to an embodiment, the ADP-layer PDU further contains bearer identifier information of a bearer to which the data belongs.

In an optional example, the device 500 may specifically be the remote terminal device in the abovementioned embodiments and the device 500 may be configured to execute each flow and/or step corresponding to the remote terminal device in the abovementioned method embodiments, which will not be elaborated herein for avoiding repetitions.

Figure 7:
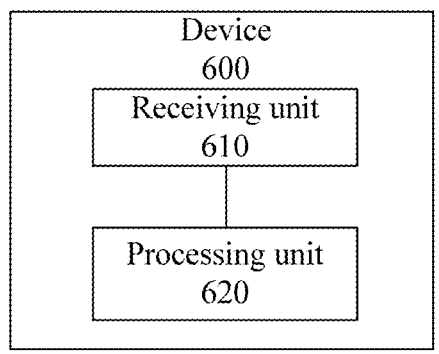
FIG. 7 illustrates a schematic block diagram of another device of relay transmission according to an embodiment of the disclosure.

FIG. 7 illustrates a device 600 of relay transmission according to an embodiment of the disclosure. The device 600 may be applied to relay transmission of downlink data. The device 600 includes a receiving unit 610 and a processing unit 620.

The receiving unit 610 is configured to receive an ADP-layer PDU sent by a relay terminal device, the ADP-layer PDU containing identifier information of the device 600.

The processing unit 620 is configured to acquire the identifier information, contained in the ADP-layer PDU received by the receiving unit 610, of the device 600 in an ADP layer of layer 2 and determine the remote terminal device corresponding to the ADP-layer PDU according to the acquired identifier information of the device 600.

According to an embodiment, the identifier information of the device 600 includes an ADP-layer identifier of the device 600 or a terminal device identifier of the device 600.

A communication interface between the relay terminal device and the device 600 is a first interface.

According to an embodiment, in a user-plane protocol stack, corresponding to the first interface, of the relay terminal device, layer 2 may only include a bottom layer and an ADP layer located above the bottom layer. Or, in the user-plane protocol stack, corresponding to the first interface, of the relay terminal device, layer 2 includes the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the relay terminal device and the device 600.

In an optional example, the device 600 may specifically be the remote terminal device in the abovementioned embodiments and the device 600 may be configured to execute each flow and/or step corresponding to the remote terminal device in the abovementioned method embodiments, which will not be elaborated herein for avoiding repetitions.

Figure 8:
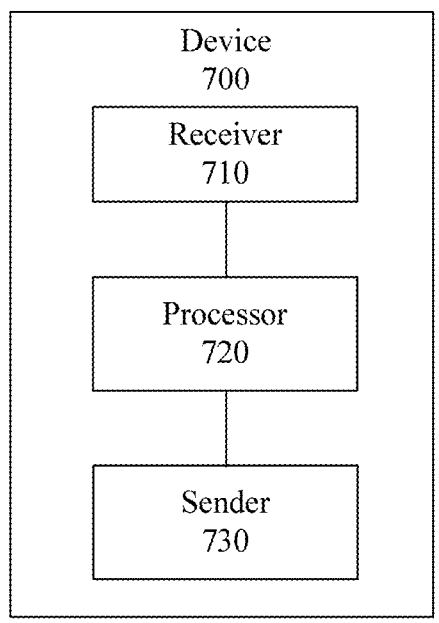
FIG. 8 illustrates a schematic block diagram of another device of relay transmission according to an embodiment of the disclosure.

FIG. 8 illustrates a device 700 of relay transmission according to an embodiment of the disclosure. The device 700 includes a receiver 710, processor 720 and sender 730 which are sequentially coupled.

In an optional embodiment, the device 700 may be applied to relay transmission of uplink data.

The receiver 710 may be configured to receive an ADP-layer PDU sent to a network device by a remote terminal device, the ADP-layer PDU containing identifier information of the remote terminal device and the ADP-layer PDU being obtained by performing, by the remote terminal device, encapsulation processing on data contained in the ADP-layer PDU in an ADP layer of layer 2.

The processor 720 may be configured to acquire the identifier information, contained in the ADP-layer PDU received by the receiver 710, of the remote terminal device in an ADP layer of layer 2.

The sender 730 may be configured to forward the data contained in the ADP-layer PDU to the network device according to the identifier information, acquired by the processor 720, of the remote terminal device.

According to an embodiment, the identifier information of the remote terminal device may include an ADP-layer identifier of the remote terminal device or a terminal device identifier of the remote terminal device.

According to an embodiment, the processor 720 is further configured to generate a layer-2 PDU corresponding to a second interface according to the identifier information of the remote terminal device, the second interface being a communication interface between the device 700 and the network device.

Correspondingly, the sender 730 is specifically configured to send the layer-2 PDU, generated by the processor 720, corresponding to the second interface to the network device.

According to an embodiment, a header of the ADP-layer PDU may contain indication information. The indication information is configured to indicate that the data contained in the ADP-layer PDU is relay data. In such case, the processor 720 may further be configured to, before the sender 730 forwards the data contained in the ADP-layer PDU to the network device according to the acquired identifier information of the remote terminal device, determine that the data contained in the ADP-layer PDU is required to be forwarded to the network device according to the indication information contained in the ADP-layer PDU.

In another optional embodiment, the device 700 may be applied to relay transmission of downlink data.

The receiver 710 may be configured to receive a data packet sent to the remote terminal device by the network device.

According to an embodiment, the data packet may specifically be a layer-1 data frame or a layer-2 PDU.

The processor 720 may be configured to perform encapsulation processing on data contained in the data packet received by the receiver 410 in the ADP layer of layer 2 to obtain the ADP-layer PDU, the ADP-layer PDU containing the identifier information of the remote terminal device.

The sender 730 may be configured to send the ADP-layer PDU obtained by the processor 720 to the remote terminal device.

According to an embodiment, the receiver 710 may specifically be configured to receive the layer-2 PDU sent to the remote terminal device by the network device and corresponding to the second interface, the layer-2 PDU corresponding to the second interface containing the data and the second interface being the communication interface between the device and the network device.

According to an embodiment, the data packet contains a relay specific LCID. In such case, the processor 720 may further be configured to, before encapsulation processing is performed on the data contained in the data packet in the ADP layer of layer 2 to obtain the ADP-layer PDU, determine that the data contained in the data packet is required to be forwarded according to the relay specific LCID.

According to an embodiment, the data packet is scheduled by the network device through a PDCCH scrambled by a relay specific RNTI. In such case, the processor 720 may further be configured to, before encapsulation processing is performed on the data contained in the data packet in the ADP layer of layer 2 to obtain the ADP-layer PDU, determine that the data contained in the data packet is required to be forwarded according to the relay specific RNTI adopted for the PDCCH configured to schedule the data packet.

In the embodiment of the disclosure, a communication interface between the device 700 and the remote terminal device may be a first interface.

According to an embodiment, in a user-plane protocol stack, corresponding to the first interface, of the device 700, layer 2 may only include a bottom layer and the ADP layer located above the bottom layer. Or, in the user-plane protocol stack, corresponding to the first interface, of the device 700, layer 2 may include the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the device and the remote terminal device.

Specifically, the layer located below the ADP layer may include layer 1 and the bottom layer of layer 2.

It should be understood that the device 700 may specifically be the relay terminal device in the abovementioned embodiments and may be configured to execute each step and/or flow corresponding to the relay terminal device in the abovementioned method embodiments. According to an embodiment, the device 700 may further include a memory. The memory may include a Read-Only Memory (ROM) and a Random Access Memory (RAM) and provides an instruction and data for the processor. A part of the memory may further include a nonvolatile RAM. For example, the memory may further store information of a device type. The processor may be configured to execute the instruction stored in the memory. When the processor executes the instruction stored in the memory, the processor is configured to execute each step and/or flow of the abovementioned method embodiments.

Figure 9:
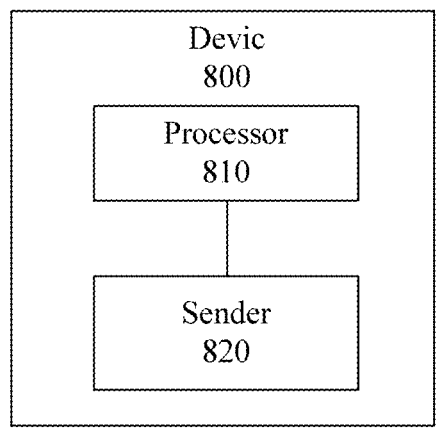
FIG. 9 illustrates a schematic block diagram of another device of relay transmission according to an embodiment of the disclosure.

FIG. 9 illustrates a device 800 of relay transmission according to an embodiment of the disclosure. The device 800 may be applied to relay transmission of uplink data. The device 800 includes a processor 810 and a sender 820.

The processor 810 is configured to perform encapsulation processing on data to be sent to a network device in an ADP layer of layer 2 to obtain an ADP-layer PDU, the ADP-layer PDU containing identifier information of the device 800.

The sender 820 is configured to send the ADP-layer PDU generated by the processor 810 to a relay terminal device.

According to an embodiment, the identifier information of the device 800 includes an ADP-layer identifier of the device 800 or a terminal device identifier of the device 800.

A communication interface between the relay terminal device and the device 800 may specifically be a first interface.

According to an embodiment, in a user-plane protocol stack, corresponding to the first interface, of the relay terminal device, layer 2 may only include a bottom layer and an ADP layer located above the bottom layer. Or, in the user-plane protocol stack, corresponding to the first interface, of the relay terminal device, layer 2 includes the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the relay terminal device and the device 800.

According to an embodiment, a header of the ADP-layer PDU contains indication information. The indication information is configured to indicate that the data contained in the ADP-layer PDU is relay data.

According to an embodiment, the ADP-layer PDU further contains bearer identifier information of a bearer to which the data belongs.

It should be understood that the device 800 may specifically be the remote terminal device in the abovementioned embodiments and may be configured to execute each step and/or flow corresponding to the remote terminal device in the abovementioned method embodiments. According to an embodiment, the device 800 may further include a memory. The memory may include a ROM and a RAM and provides an instruction and data for the processor. A part of the memory may further include a nonvolatile RAM. For example, the memory may further store information of a device type. The processor may be configured to execute the instruction stored in the memory. When the processor executes the instruction stored in the memory, the processor is configured to execute each step and/or flow of the abovementioned method embodiments.

Figure 10:
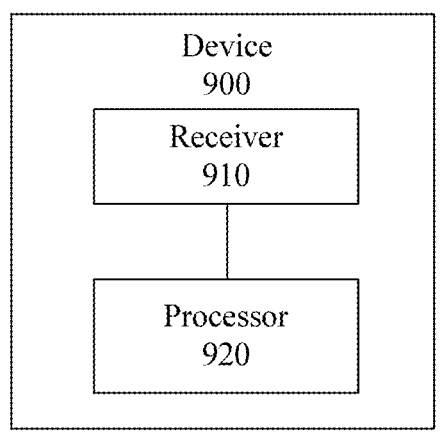
FIG. 10 illustrates a schematic block diagram of another device of relay transmission according to an embodiment of the disclosure.

FIG. 10 illustrates a device 900 of relay transmission according to an embodiment of the disclosure. The device 900 may be applied to relay transmission of downlink data. The device 900 includes a receiver 910 and a processor 920.

The receiver 910 is configured to receive an ADP-layer PDU sent by a relay terminal device, the ADP-layer PDU containing identifier information of the device 900.

The processor 920 is configured to acquire the identifier information, contained in the ADP-layer PDU received by the receiver 910, of the device 900 in an ADP layer of layer 2 and determine the remote terminal device corresponding to the ADP-layer PDU according to the acquired identifier information of the device 900.

According to an embodiment, the identifier information of the device 900 includes an ADP-layer identifier of the device 900 or a terminal device identifier of the device 900.

A communication interface between the relay terminal device and the device 900 is a first interface.

According to an embodiment, in a user-plane protocol stack, corresponding to the first interface, of the relay terminal device, layer 2 may only include a bottom layer and an ADP layer located above the bottom layer. Or, in the user-plane protocol stack, corresponding to the first interface, of the relay terminal device, layer 2 includes the bottom layer, the ADP layer, an RLC layer and a PDCP layer. The ADP layer is located between the RLC layer and the bottom layer.

According to an embodiment, in the user-plane stack protocol corresponding to the first interface, a layer located below the ADP layer may correspond to a D2D communication technology adopted between the relay terminal device and the device 900.

It should be understood that the device 900 may specifically be the remote terminal device in the abovementioned embodiments and may be configured to execute each step and/or flow corresponding to the remote terminal device in the abovementioned method embodiments. According to an embodiment, the device 900 may further include a memory. The memory may include a ROM and a RAM and provides an instruction and data for the processor. A part of the memory may further include a nonvolatile RAM. For example, the memory may further store information of a device type. The processor may be configured to execute the instruction stored in the memory. When the processor executes the instruction stored in the memory, the processor is configured to execute each step and/or flow of the abovementioned method embodiments.

It should be understood that, in the embodiments of the disclosure, the processor may be a Central Processing Unit (CPU) and the processor may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

An embodiment of the disclosure further provides a wireless communication system, which may include a relay terminal device, remote terminal device and network device in any abovementioned embodiment.

It should be understood that, in the disclosure, the descriptions about the embodiments are made with emphasis on differences between each embodiment and the same or similar parts may refer to each other and will not be elaborated herein for simplicity.

In an implementation process, each step of the method may be completed by an integrated logic circuit of hardware in the processor or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically PROM (EPROM) and a register. The storage medium is located in the memory, and the processor reads the instruction in the memory, and completes the steps of the method in combination with hardware. No more detailed descriptions will be made herein to avoid repetitions.

It should be understood that, in the disclosure, the descriptions about the embodiments are made with emphasis on differences between each embodiment and the same or similar parts may refer to each other to avoid repetitions.

Those of ordinary skill in the art may realize that the steps and units of each method described in combination with the embodiments disclosed in the disclosure may be implemented by electronic hardware, computer software or a combination of the two. For clearly describing exchangeability of hardware and software, the steps and compositions of each embodiment have been generally described in the foregoing descriptions according to functions. Whether these functions are executed in a hardware or software manner depends on specific applications and design constraints of the technical solutions. Those of ordinary skill in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be PHY units, and namely may be located in the same place, or may also be distributed to multiple network units. Part or all of the units may be selected to achieve the purpose of the solutions of the embodiments of the disclosure according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure shall fall within the scope of protection of the disclosure and these modifications or replacements shall fall within the scope of protection of the disclosure. Therefore, the scope of protection of the disclosure shall be subject to the scope of protection of the claims.

The invention claimed is:

1. A method of relay transmission, comprising:
receiving, by a relay terminal device, an ADPtive (ADP)-layer Protocol Data Unit (PDU) sent to a network device by a remote terminal device, the ADP-layer PDU containing identifier information of the remote terminal device and the ADP-layer PDU being obtained through performing, by the remote terminal device, encapsulation processing on data contained in the ADP-layer PDU in an ADP layer of layer 2;
acquiring, by the relay terminal device, the identifier information, contained in the ADP-layer PDU, of the remote terminal device in an ADP layer of layer 2; and
forwarding, by the relay terminal device according to the acquired identifier information of the remote terminal device, the data contained in the ADP-layer PDU to the network device.

2. The method of claim 1, wherein the identifier information of the remote terminal device comprises an ADP-layer identifier of the remote terminal device or a terminal device identifier of the remote terminal device.

3. The method of claim 1, wherein, in a user-plane protocol stack, corresponding to a first interface, of the relay terminal device, layer 2 only comprises a bottom layer and the ADP layer located above the bottom layer; or
in the user-plane protocol stack, corresponding to the first interface, of the relay terminal device, layer 2 comprises the bottom layer, the ADP layer, a Radio Link Control (RLC) layer and a Packet Data Convergence Protocol (PDCP) layer, the ADP layer being located between the RLC layer and the bottom layer,
wherein the first interface is a communication interface between the relay terminal device and the remote terminal device.

4. The method of claim 1, wherein, in the user-plane protocol stack corresponding to the first interface, a layer located below the ADP layer corresponds to a Device-to-Device (D2D) communication technology adopted between the relay terminal device and the remote terminal device.

5. The method of claim 1, wherein forwarding, by the relay terminal device according to the acquired identifier information of the remote terminal device, the data contained in the ADP-layer PDU to the network device comprises:
generating, by the relay terminal device according to the identifier information of the remote terminal device, a layer-2 PDU corresponding to a second interface, the second interface being a communication interface between the relay terminal device and the network device; and
sending, by the relay terminal device, the layer-2 PDU corresponding to the second interface to the network device.

6. The method of claim 1, wherein a header of the ADP-layer PDU contains indication information, and the indication information is configured to indicate that the data contained in the ADP-layer PDU is relay data; and
before forwarding, by the relay terminal device according to the acquired identifier information of the remote terminal device, the data contained in the ADP-layer PDU to the network device, the method further comprises:
determining, by the relay terminal device according to the indication information contained in the ADP-layer PDU, that the data contained in the ADP-layer PDU is required to be forwarded to the network device.

7. The method of claim 1, wherein the ADP-layer PDU further contains bearer identifier information of a bearer to which the data belongs.

8. A method of relay transmission, comprising:
receiving, by a relay terminal device, a data packet sent to a remote terminal device by a network device;
performing, by the relay terminal device, encapsulation processing on data contained in the data packet in an ADPtive (ADP) layer of layer 2 to obtain an ADP-layer Protocol Data Unit (PDU), the ADP-layer PDU containing identifier information of the remote terminal device; and
sending, by the relay terminal device, the ADP-layer PDU to the remote terminal device.

9. The method of claim 8, wherein the identifier information of the remote terminal device comprises an ADP-layer identifier of the remote terminal device or a terminal device identifier of the remote terminal device.

10. The method of claim 8, wherein, in a user-plane protocol stack, corresponding to a first interface, of the relay terminal device, layer 2 only comprises a bottom layer and the ADP layer located above the bottom layer; or
in the user-plane protocol stack, corresponding to the first interface, of the relay terminal device, layer 2 comprises the bottom layer, the ADP layer, a Radio Link Control (RLC) layer and a Packet Data Convergence Protocol (PDCP) layer, the ADP layer being located between the RLC layer and the bottom layer,
wherein the first interface is a communication interface between the relay terminal device and the remote terminal device.

11. The method of claim 8, wherein, in the user-plane protocol stack corresponding to the first interface, a layer located below the ADP layer corresponds to a Device-to-Device (D2D) communication technology adopted between the relay terminal device and the remote terminal device.

12. The method of claim 8, wherein receiving, by the relay terminal device, the data packet sent to the remote terminal device by the network device comprises:
receiving, by the relay terminal device, a layer-2 PDU sent to the remote terminal device by the network device and corresponding to a second interface, the layer-2 PDU corresponding to the second interface containing the data and the second interface being a communication interface between the relay terminal device and the network device.

13. The method of claim 8, wherein the data packet contains a relay specific Logical Channel Identifier (LCID); and
before performing, by the relay terminal device, encapsulation processing on the data contained in the data packet in the ADP layer of layer 2 to obtain the ADP-layer PDU, the method further comprises:
determining, by the relay terminal device according to the relay specific LCID, that the data contained in the data packet is required to be forwarded.

14. The method of claim 8, wherein the data packet is scheduled by the network device through a Physical Downlink Control Channel (PDCCH) scrambled by a relay specific Radio Network Temporary Identity (RNTI); and
before performing, by the relay terminal device, encapsulation processing on the data contained in the data packet in the ADP layer of layer 2 to obtain the ADP-layer PDU, the method further comprises:
determining, by the relay terminal device according to the relay specific RNTI adopted for the PDCCH configured to schedule the data packet, that the data contained in the data packet is required to be forwarded.

15. The method of claim 8, wherein the ADP-layer PDU further contains bearer identifier information of a bearer to which the data belongs.

16. A device of relay transmission, comprising a processor and one or more units stored on a memory, the one or more units comprising:
a receiving unit, configured to receive an ADPtive (ADP)-layer Protocol Data Unit (PDU) sent to a network device by a remote terminal device, the ADP-layer PDU containing identifier information of the remote terminal device and the ADP-layer PDU being obtained by performing, by the remote terminal device, encapsulation processing on data contained in the ADP-layer PDU in an ADP layer of layer 2;
a processing unit, configured to acquire the identifier information, contained in the ADP-layer PDU received by the receiving unit, of the remote terminal device in an ADP layer of layer 2; and
a sending unit, configured to forward the data contained in the ADP-layer PDU to the network device according to the identifier information, acquired by the processing unit, of the remote terminal device.

17. The device of claim 16, wherein the identifier information of the remote terminal device comprises an ADP-layer identifier of the remote terminal device or a terminal device identifier of the remote terminal device.

18. The device of claim 16, wherein, in a user-plane protocol stack, corresponding to a first interface, of the device, layer 2 only comprises a bottom layer and the ADP layer located above the bottom layer: or
in the user-plane protocol stack, corresponding to the first interface, of the device, layer 2 comprises the bottom layer, the ADP layer, a Radio Link Control (RLC) layer and a Packet Data Convergence Protocol (PDCP) layer, the ADP layer being located between the RLC layer and the bottom layer,
wherein the first interface is a communication interface between the device and the remote terminal device.

19. The device of claim 16, wherein, in the user-plane protocol stack corresponding to the first interface, a layer located below the ADP layer corresponds to a Device-to-Device (D2D) communication technology adopted between the device and the remote terminal device.

20. The device of claim 16, wherein the processing unit is further configured to generate a layer-2 PDU corresponding to a second interface according to the identifier information of the remote terminal device, the second interface being a communication interface between the device and the network device; and
the sending unit is configured to send the layer-2 PDU, generated by the processing unit, corresponding to the second interface to the network device.

* * * * *